United States Patent [19]

Kouda et al.

[11] Patent Number: 5,161,215
[45] Date of Patent: Nov. 3, 1992

[54] METHOD FOR CONTROLLING DATA TRANSFER BUFFER

[75] Inventors: Katsuya Kouda, Yokohama; Masaharu Iwanaga, Kamakura, both of Japan

[73] Assignee: Hitachi, Ltd., Tokyo, Japan

[21] Appl. No.: 464,587

[22] Filed: Jan. 11, 1990

Related U.S. Application Data

[63] Continuation of Ser. No. 55,181, May 28, 1987, abandoned.

[30] Foreign Application Priority Data

Jun. 2, 1986 [JP] Japan .................................. 61-125725

[51] Int. Cl.⁵ .......................................... G06F 13/00
[52] U.S. Cl. ............................... 395/250; 364/DIG. 1; 364/239.1; 364/231.6; 364/260.2; 364/284.1; 364/244.3; 395/775
[58] Field of Search ... 364/200 MS File, 900 MS File; 395/250, 775

[56] References Cited

U.S. PATENT DOCUMENTS

| 4,158,235 | 6/1979 | Call et al. ............................. 364/900 |
| 4,208,714 | 6/1980 | Eklund et al. ........................ 364/200 |
| 4,395,757 | 7/1983 | Bienvenu et al. .................... 364/200 |
| 4,449,182 | 5/1984 | Rubinson et al. .................... 364/200 |
| 4,543,627 | 9/1985 | Schwab ................................ 364/200 |
| 4,594,657 | 6/1986 | Byrns ................................... 364/200 |

FOREIGN PATENT DOCUMENTS 0077008 4/1983 European Pat. Off. .
0134115 3/1985 European Pat. Off. .

Primary Examiner—Eddie P. Chan
Attorney, Agent, or Firm—Fay, Sharpe, Beall, Fagan, Minnich & McKee

[57] ABSTRACT

In a data processing system in which data is transferred between memory areas through a transfer buffer shared by the memory areas, receive capability indication means which is commonly accessable by the memory areas and contains information indicating whether data can be transferred to the respective memory areas or not is provided, and data to be transferred from one memory area to other memory area is stored in the transfer buffer in accordance with the content of the receive capability indicator.

2 Claims, 6 Drawing Sheets

METHOD FOR CONTROLLING DATA TRANSFER BUFFER

This is a continuation of application Ser. No. 055,181, filed May 28, 1987, now abandoned.

BACKGROUND OF THE INVENTION

1. Field of the Invention

The present invention relates to a method for controlling a data transfer buffer suitable for use when capacity of the buffer is limited in a computer system in which information is transmitted and received through the buffer.

2. Description of the Prior Art

In a computer system, a memory area called a user space is allocated to each of a plurality of user programs in a main memory.

When data is to be transferred between user spaces transfer data is stored under control of the user program, from a transferring location, to a transfer buffer in a memory area to be commonly accessed by the user programs, and the data in the transfer buffer is received, under control of a user program from a destination location, by a memory area to which the user program of the destination area belongs. In the prior art system, sufficient consideration was not paid to the capability of reception at the destination space, and the transfer data would be stored in the transfer buffer area in response to a transfer request irrespective of whether the destination space is ready to receive the data or not. The information is enqueued to a transfer querie which manages readout of the stored data. As a result, if the destination station is not ready to receive the information, the information is held in the transfer buffer area. Thus, if a large amount of data is transferred between spaces, the information may be held for a long time. JP-A-58-1222 teaches providing a large capacity data buffer and sharing it for a plurality of times of data transfer.

However, even in this above manner, there is a certain probability that most portions of the buffer area may be occupied by data. In this case, the request for data transfer is rejected.

SUMMARY OF THE INVENTION

It is an object of the present invention to transfer data while preventing data from being held in a transfer buffer area.

In accordance with the present invention, indication means for indicating a status of a receive buffer in each space is arranged in a common area to the system. The information of the display unit is referenced by the transfer location so that it grasps the status of the receive buffer at the destination location. Thus, whether the destination station may immediately receive the data or not is checked, and if it may receive, the transfer data is sent to the transfer buffer. The transfer location determines the amount of data receivable by the destination and sends that amount of data. Thus, the transfer of an amount of data not receivable by the destination station into the buffer is prevented. By queuing a transfer request on a FIFO basis on each space to which the request was issued, separately from the transfer processing, the transfer may be suspended until it is permitted, without any special processing.

DESCRIPTION OF THE PREFERRED EMBODIMENTS

Figure 1:
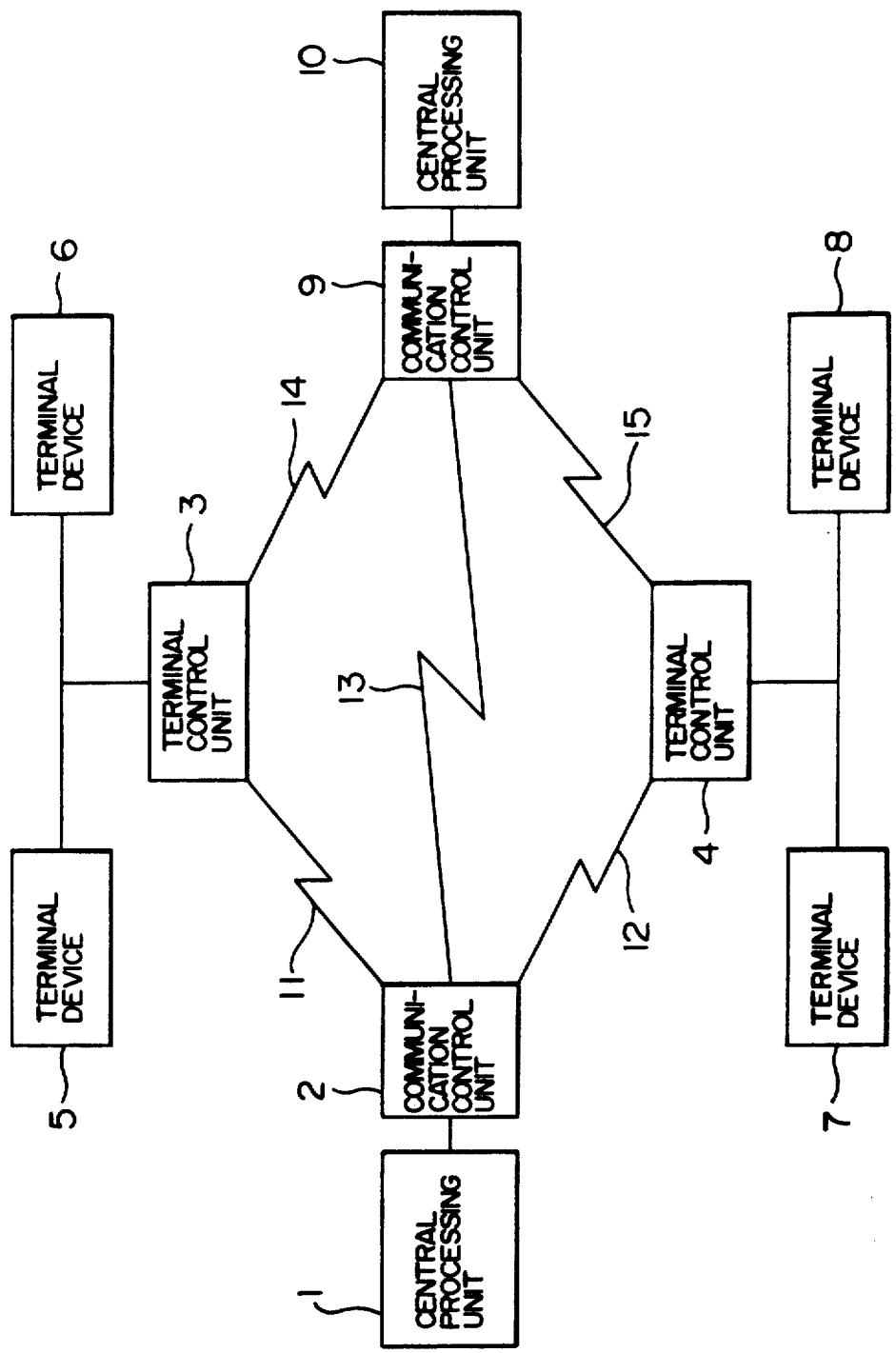
FIG. 1 shows an overall configuration of an electronic computer system to which the present invention is applied.

FIG. 1 shows an overall configuration of an electronic computer system to which the present invention is applied. It comprises a central processing unit 1, a communication control unit 2, terminal control units 3 and 4 connected thereto through lines 11 and 12, respectively, terminal devices 5, 6, 7 and 8 connected thereto, a communication control unit 9 connected to the communication control unit 2 through a line 13, and a central processing unit 10 connected thereto. The communication control unit 9 is also connected to the terminal control units 3 and 4 through lines 14 and 15, respectively.

Figure 2:
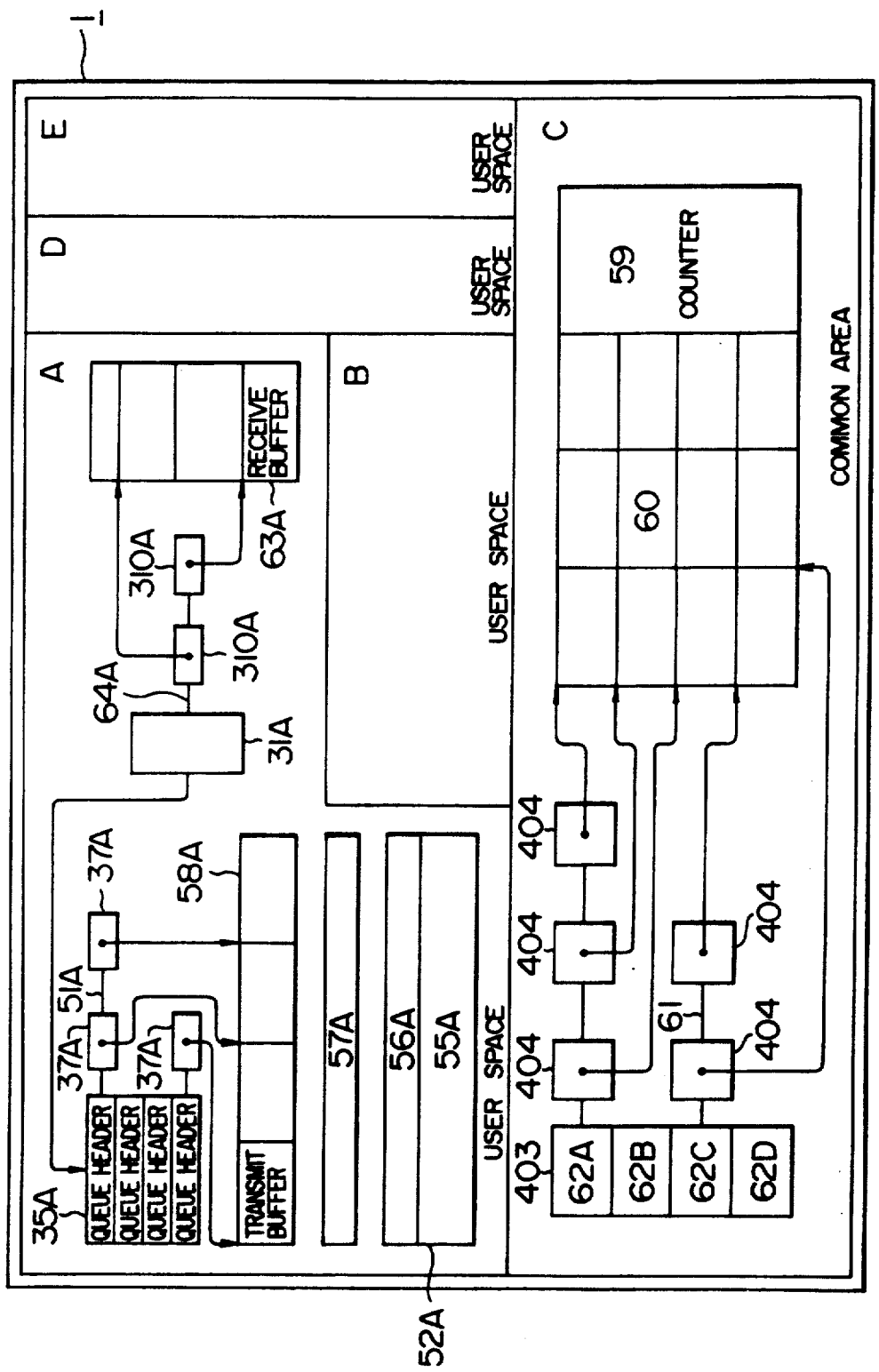
FIG. 2 shows a configuration in a central processing unit.

In the electronic computer system thus configured, one embodiment of the present invention in which information is transferred between spaces in each of the central processing units in accordance with a request from or to the terminal device or central processing unit in the network, is explained with reference to FIG. 2. A, B, D and E in the central processing unit 1 denote memory spaces in user programs, and C denotes a common area shared by those spaces. Information is transferred between the spaces through the common area C. A detailed configuration of the memory space A is shown in FIG. 2.

The memory spaces B, D and E are configured in the same way. In order to identify the elements in the memory space A, the reference numerals are followed by "A". Assuming that a request to transfer information in space A to space B has been issued, a transfer request program 57A registers the request into a transfer queue 51A by an enque command. The transfer request program 57A examines a destination, puts together information to be transferred to the same destination to prepare a queue, and sends a start signal to a transfer execution program 52A. Then, the information is dequeued from the transfer request queues 51A on first-in first-out basis. The dequeued information is checked. That is, receive buffers 62 A-D for the respective spaces and the common buffer counter 59 in the common buffer area C are checked. The counter 62B retains a count indicating the number of receivable buffer areas having the same size in the receive buffer 58B in the destination space. If the count of the counter 62B is "0", the transfer is stopped and the previous dequeue command is cancelled. Accordingly, the transfer request is retained in the queue 51A. On the other hand, if the count of the counter 62B is not "0", it means that the information may be transferred, and the counter is decremented by one.

The transfer common buffer pool 60 has a buffer divided into areas of the same size. Counter 59 counts the number of free buffers which are not being used by others. If the count of the counter 59 is "0", the dequeue command is cancelled. If the count of the counter 59 is not "0", one buffer area is allocated as a transfer buffer, the counter 59 is decreased by one, and the transfer information is copied into the secured transfer buffer 60. Thereafter, the transfer buffer 60 is enqueued. In the transfer queue 61, addresses indicating areas of the buffer 60 are chained for each address in the sequence of occurrence. That is, they are queued for each destination, like the transfer request queue 51A. A start signal is sent to the transfer execution unit 52B of the destination space to start 52B. The reception of data is now explained. The transfer queue/dequeue unit 55B in the started 52B dequeues a header of the transfer queue to itself from the transfer queue 61 on a first-in first-out basis. The dequeued information is sent to the receive unit 56B and the content thereof is copied into the receive buffer 58B. Upon an end of copying, the transfer buffer is vacant. The counter 59 is incremented by "1" and the transfer operation is terminated. The receive buffer 58B is released after required processing in the space B. When it is released, the counter 62B is incremented by one.

A detail of the transfer operation in the present embodiment is explained with reference to a flow chart and a table format.

Figure 3:
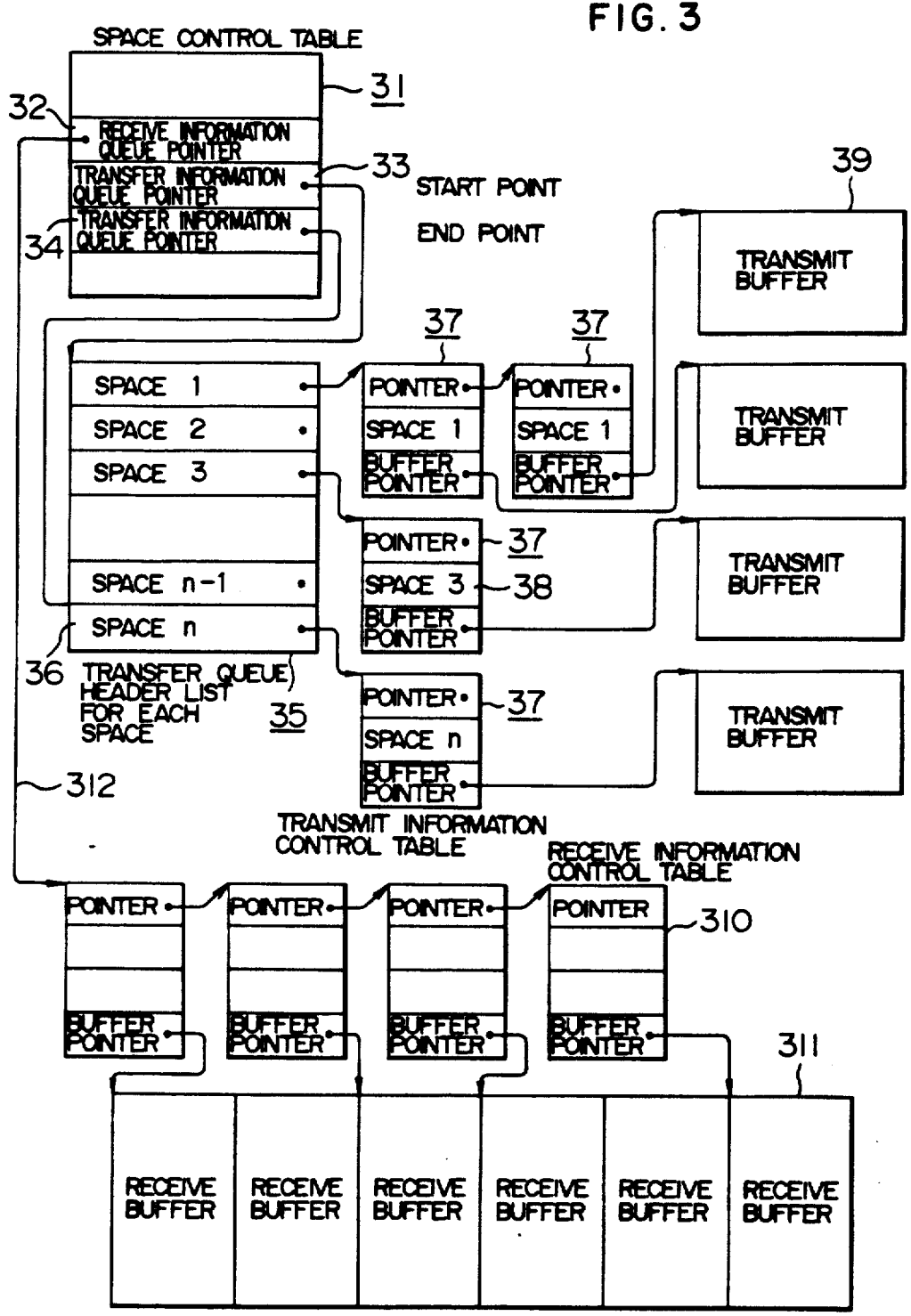
FIG. 3 shows a format of a table and a buffer area in each user area in one embodiment of the present invention.

FIG. 3 shows a detail of a table prepared in each user space.

A space control table 31 is prepared in each space. It contains a transfer information queue pointer 33 which points to a start point of a transfer queue header list 35 for each space, and a transfer information queue pointer 34 which points to an end point. The entry of the transfer queue header list 35 is provided for each destination space. If no information transfer request has been issued in the space, the header list 35 is all-zeros. As many header lists 35 as a maximum number 36 of spaces permitted to exist in the system are provided.

The transmit buffer 39 stores the transmit data generated by executing the user program. The transmit buffer 39 is prepared by allocating memory areas by a conventional control table. The transmit information control table 37 is prepared when the transmit data is stored in the transmit buffer. A predetermined number of receive buffers 311 are provided in the user space. If data is stored therein, a receive information control table 310 is prepared and it is accessable by a space control table 31.

Figure 4:
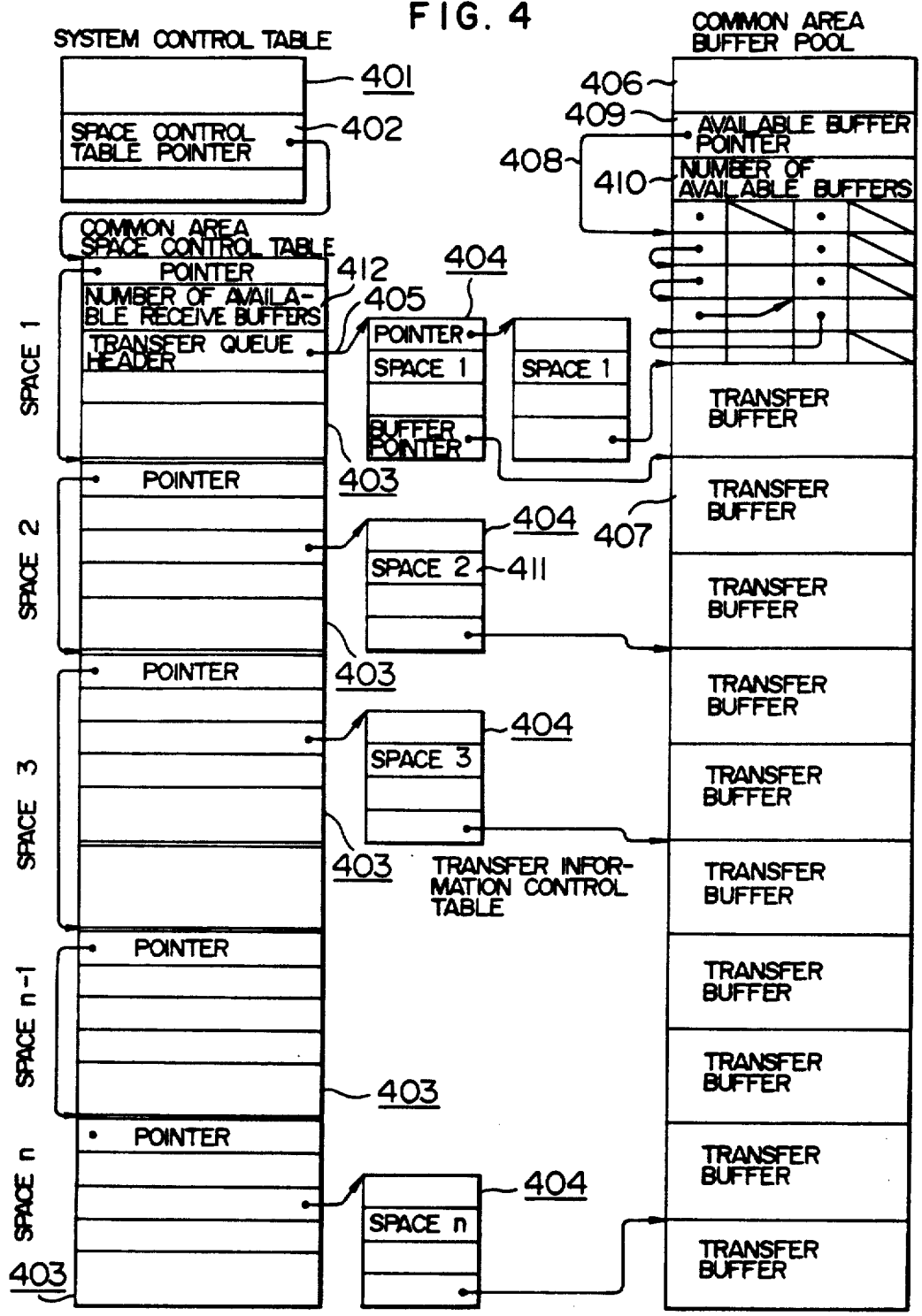
FIG. 4 shows a format of a table in a common area and a transfer buffer.

FIG. 4 shows in detail of the table prepared in the common area for use in the check. As many space control tables 403 as permitted to exist in the system when the system was structured, control the destination receive buffers 311. One control table 403 is allotted for each space newly established. The common area space control table 403 contains the number 412 of operable receive buffers 311 which are present in the assigned space. A predetermined number of transfer buffers 407 are provided. A size of one plane of the transfer buffer 407 is equal to that of the receive buffer 311 in the user space. Thus, information copied on one plane of the transfer buffer 407 in the common area can be copied onto one plane of the receive buffer 311.

Processing for transferring data from one user space to other user space is explained.

When a transfer request is issued from the user program, a transfer request processing program prepares a transmit information control table 37 (FIG. 3) in which a destination space name is registered and which has a buffer pointer to point to a transmit buffer in which the transfer data is to be stored. Then, the destination space 38 (FIG. 3) is read from the transmit information control table 37 and the transmit information control table 37 is enqueued into a corresponding queue header of the transfer queue header list 35 (FIG. 3) in accordance with the content of the destination space 38. As the transfer request processing program has enqueued the transmit request control table 37 into the transfer queue header list 35, it sends a start signal to the transfer execution program of FIG. 5.

Figure 5:
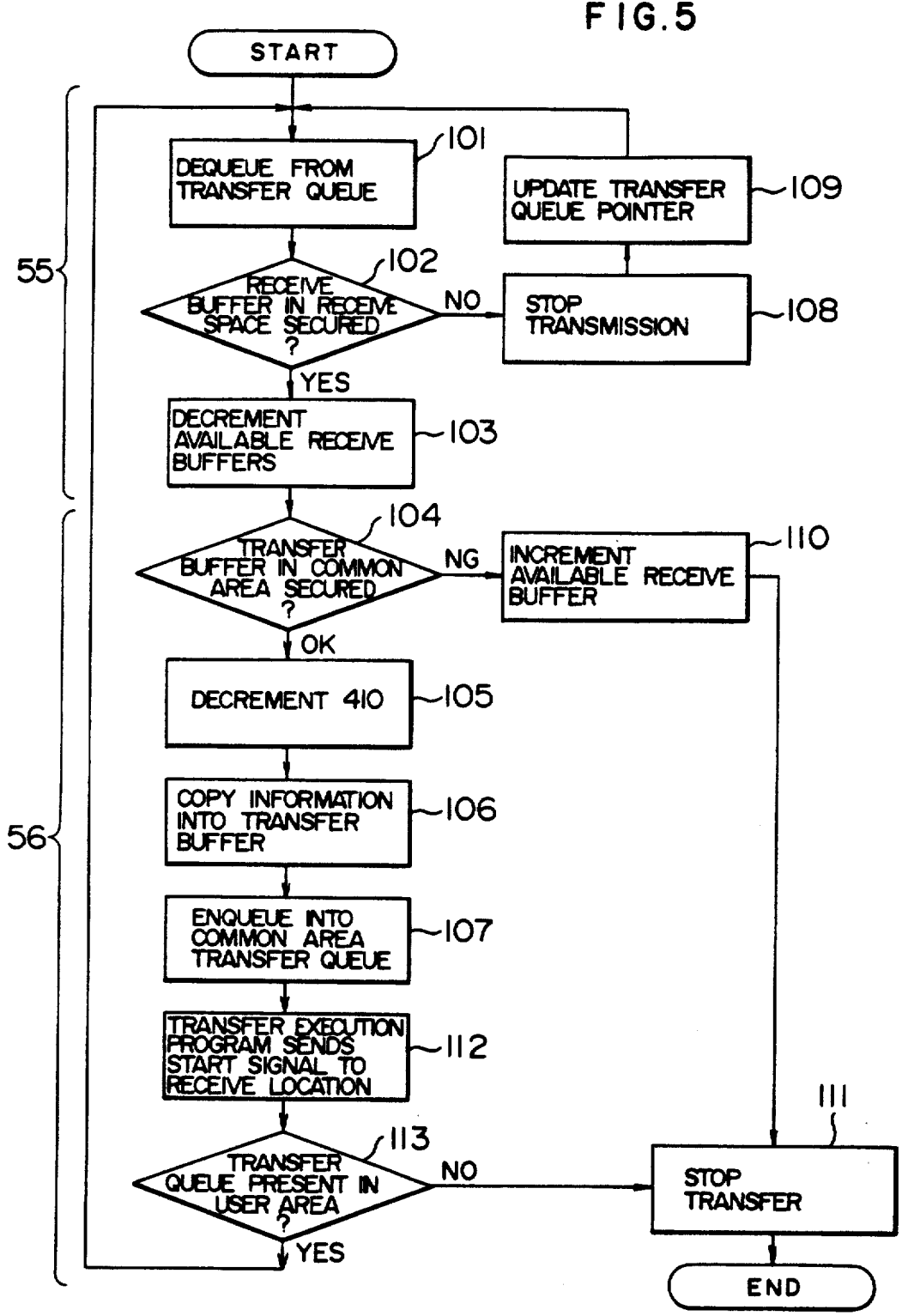
FIG. 5 shows a transmit flow chart in a transfer execution program.

The transfer execution program of FIG. 5 dequeues the transmit information control table 37 queued in the transfer queue header 35 pointed by the space control table 31, from the start point 33 of the header on first-in first-out basis (101). Before the table is dequeued from the chain, the following check is carried out.

The transfer execution program first obtains a pointer for the common area space control table 403 from the system control table 401 in the common area. Then, it obtains the number of operable receive buffers 412 in the receive space from the common area space control table 403. The number of planes of the receive buffer prepared for the space has been set when the system was structured. If there are 20 planes in receive buffer in the space, the number 412 is 20. If the number is not zero (YES in 102), it means that the buffer which is usable as a receive buffer still remains in the space. In order to reserve that receive buffer, the entry is decremented by one (103). Thus, the number of usable receive buffers is decremented by one and one plane of receive buffer in the space is reserved. If the number is zero, it means that no information can be transferred to that space. Thus, the transfer execution ceases the transfer to the space pointed by the transfer queue header list 35 in the space (108), and updates the pointer to the next space (109). As a result, the transfer execution program is resumed for the next space rather than the previous space. The transfer request issued to the previous space is chained in the transfer queue header list without being dequeued.

If one plane of the receive buffer has been successfully secured by the check of the number of usable receive buffers by the transfer execution program, then the number of usable buffers 410 in a base portion of the buffer pool 406 in the common area is checked (104). If the entry is not zero, it means that an area usable as a transfer buffer still remains in the common area, and one plane is secured from a free queue pointed by the usable buffer pointer 409 and the number of usable buffers is decremented by one (105). The number of usable buffers 410 corresponds to the number of planes of the buffers prepared in the common area when the system is structured. If there are ten planes in the transfer buffers prepared in the common area, the number 410 is ten. If the number is zero, the transfer is ceased as is done for the check of the number of usable receive buffers 412 of the common area space control table 403. In order to release the receive buffer in the receive space which has already been reserved, the number of usable receive buffers 412 of the common area space control table 403 is incremented by one (110). The transfer execution program ceases the execution while it chains all transfer requests in the transfer queue header list 35 (111).

After the transfer buffer of the common area has been successfully secured, the transfer information control table 37 is dequeued from the chain of the transfer queue header list 35. Information is copied to the previously secured common area transfer buffer 407 (106). The transfer information control table 404 is enqueued into the common area space control table 403.

After the enqueuing, the transfer execution program sends a start signal to the transfer execution program of the destination space (112).

Whether the transfer queue is present in the user space or not is checked (113), and if it is present, the above steps are repeated, and if it is not present, the process is terminated.

Figure 6:
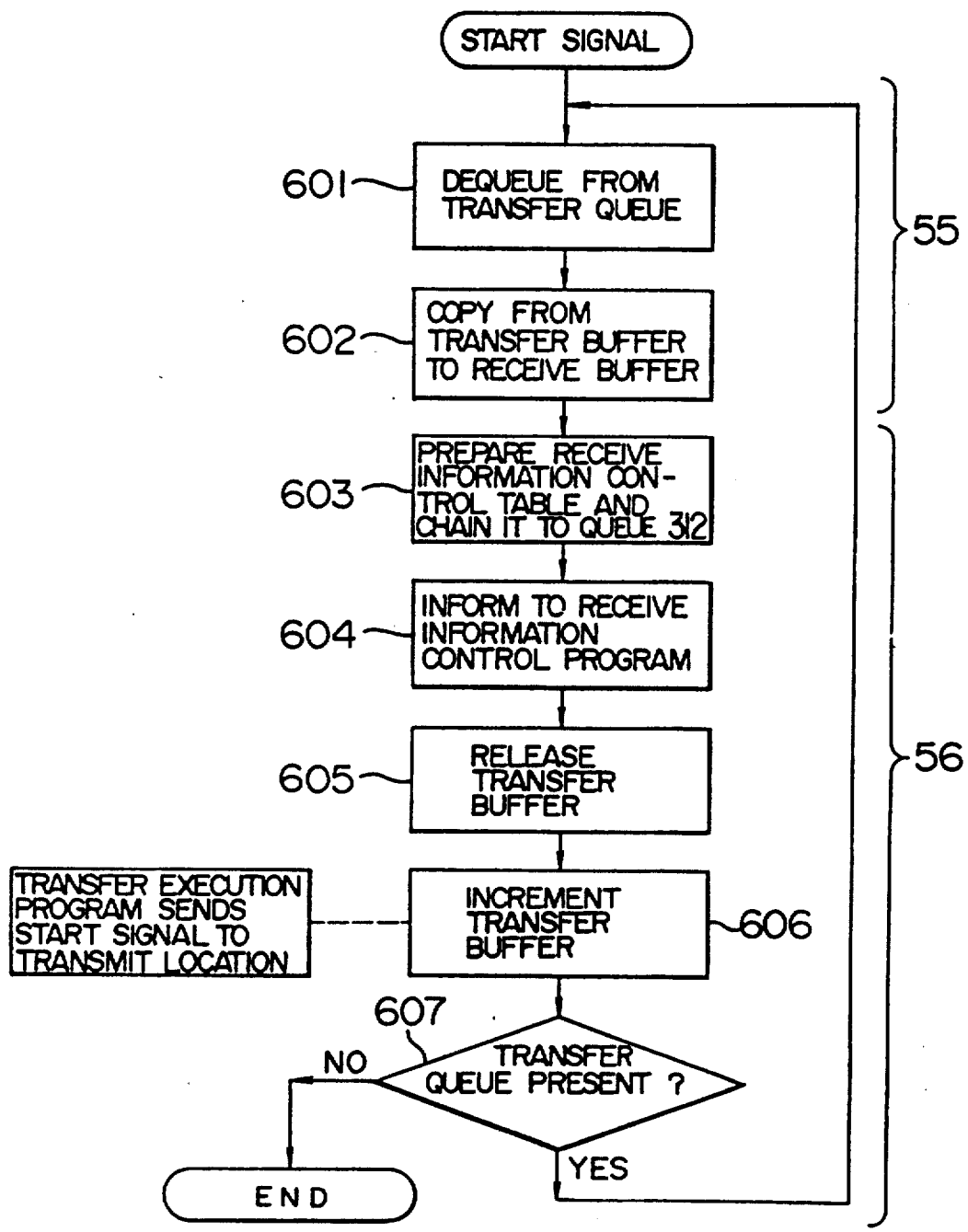
FIG. 6 shows a receive flow chart in the transfer execution program.

The transfer execution program of the receive space started from the transfer location is now explained with reference to a flow chart of FIG. 6.

As described above, after the information has been copied into the common area and enqueued into the corresponding common area space control table 403, the receive location is started. The transfer execution program in the receive location dequeues the transfer information queued in the common area space control table 403 for its own space on first-in first-out basis (601), and copies it into the previously reserved receive buffer 311 (602). After the copying, the receive information control table 310 is prepared and it is chained to the queue 312 (603). The receive information control program (604) is informed of the receipt of data. Then, the buffer 407 in the common area is released (605). The chain of the usable buffer pointers 409 is updated, the number of usable buffers 410 is incremented by one, and a signal is sent to a space in the common area which is waiting to inform that the common area buffer is available (606).

Whether the transfer queue still remains or not is checked (607), and if it remains, the above steps are repeated, and if it does not remain, the process is terminated.

After the common area buffer has been released by the receive information control program, the received information is processed in the receive space and then the receive buffer is released. When it is released, the number of usable buffers 412 in the common area space control table 403 is incremented by one. A signal is sent to all spaces to inform that there is an available receive buffer in its own space, and the transfer execution programs in the respective spaces are started.

In accordance with the present embodiment, when the receive buffer in the destination location is not ready to receive, the request has to wait at the transfer location. Thus, the common buffer for transfer is not occupied for a long time. On the other hand, it is assured that the information on the common buffer is received by the destination location. Accordingly, the information is not held for a long time. Thus, an affect to certain transfer operation by failure of other transfer is prevented.

In accordance with the present invention, since the status of the receive buffer in the receive location can be grasped at the transmit location, it is prevented that an amount of information which cannot be received is supplied to the transfer buffer and the data continuously flows on the buffer. Even if certain transfer fails due to saturation of the receive buffer, other transfer can continuously flow independently. As a result, the transfer buffer may be used as a pipeline and the failure of transfer due to buffer block or buffer shortage is prevented.

We claim:

1. A method for asynchronously controlling data transfer between processing programs in a data processing system including (i) a plurality of receiver buffers in memory areas of the processing programs, each receive buffer holding received data to be used by a corresponding one of the processing programs, (ii) a transfer buffer connected with said processing programs such that data is transferred from a first processing program with data to send to said transfer buffer and from the transfer buffer to the receive buffer of a designated other processing program, and (iii) a counter means containing a count initially set to a number of receive buffers provided in each memory area for indicating availability of the receive buffers corresponding to each processing program to receive data, said method comprising the steps of:

a) in response to one of the processing programs having data to send to a designated destination processing program, with the one data sending processing program accessing said counter means and reading the contained count indicative of the number of available receive buffers corresponding to the designated destination processing program, b) with the one data sending processing program, determining whether the at least one receive buffer corresponding to the designated destination processing program is available, c) in response to the at least one receive buffer corresponding to the designated destination processing program being indicated as available, transferring the data to be sent to the designated destination processing program from the one data sending processing program to said transfer buffer, d) transmitting the data stored in said transfer buffer from the transfer buffer to the at least one of the available receive buffers corresponding to the designated destination provessing program and decrementing said counter means each time one of the available receive buffer is occupied and, e) each time one of the receive buffers is released, incrementing the counter means.

2. A method for controlling data transfer according to claim 1 wherein said counter means has means for allowing an access commonly by said processing programs.

* * * * *